US012300067B2

(12) United States Patent
Holsclaw et al.

(10) Patent No.: US 12,300,067 B2
(45) Date of Patent: May 13, 2025

(54) GAME EVENT-BASED FUNDING FOR A PROGRESSIVE WAGERING GAME

(71) Applicant: IGT, Las Vegas, NV (US)

(72) Inventors: Ben Holsclaw, Sparks, NV (US); Brad Fredella, Henderson, NV (US); Predrag Savic, Saint Paul, MN (US); Darren Maya, Reno, NV (US)

(73) Assignee: IGT, Las Vegas, NV (US)

( * ) Notice: Subject to any disclaimer, the term of this patent is extended or adjusted under 35 U.S.C. 154(b) by 166 days.

(21) Appl. No.: 17/887,930

(22) Filed: Aug. 15, 2022

(65) Prior Publication Data

US 2024/0054857 A1 Feb. 15, 2024

(51) Int. Cl.
*G07F 17/32* (2006.01)

(52) U.S. Cl.
CPC ................................ *G07F 17/3258* (2013.01)

(58) Field of Classification Search
None
See application file for complete search history.

(56) References Cited

U.S. PATENT DOCUMENTS

2004/0106448 A1* 6/2004 Gauselmann ........... G07F 17/32 463/25
2014/0225324 A1* 8/2014 Huynh ...................... A63F 1/00 273/292
2014/0291932 A1* 10/2014 Castle, II ............ G07F 17/3267 273/292
2018/0018856 A1* 1/2018 Blazevic .................. A63F 1/12

* cited by examiner

*Primary Examiner* — Jason T Yen
(74) *Attorney, Agent, or Firm* — Sage Patent Group

(57) ABSTRACT

A gaming device includes a processor circuit and a memory including machine-readable instructions that cause the processor circuit to receive a wager and allocate a first portion of the wager to a first progressive pot. The instructions further cause the processor circuit to determine a game result for the wagering game. The instructions further cause the processor circuit to, based on the game result comprising a first game result, allocate a second portion of the wager to a second progressive pot. The instructions further cause the processor circuit to, based on the game result comprising a second game result, award a portion of the first progressive pot to a player of the wagering game. The instructions further cause the processor circuit to, based on the game result comprising a third game result, award a portion of the second progressive pot to the player.

19 Claims, 17 Drawing Sheets

GAME EVENT-BASED FUNDING FOR A PROGRESSIVE WAGERING GAME

BACKGROUND

Embodiments described herein relate to game play features with electronic wagering games, and in particular to game-event based funding for a progressive wagering game at a gaming device in a gaming environment, such as in a casino environment, and related devices, systems, and methods. Some wagering games with progressive jackpot features, such as slot games and/or video poker games provided at Electronic Gaming Machines (EGMs) in a casino environment, may provide bonus jackpots or other awards based on high-value wins, where portions of wagers from groups of EGMs are pooled into a jackpot that is awarded based on a player achieving a high-value game result, such as a royal flush in video poker for example. There is a need for providing additional options for player interaction and enjoyment for these and other types of progressive wagering games.

BRIEF SUMMARY

According to some embodiments, a gaming device includes a processor circuit and a memory including machine-readable instructions. When executed by the processor circuit, the instructions cause the processor circuit to receive a wager for a wagering game at a gaming device. The instructions further cause the processor circuit to allocate a first portion of the wager to a first progressive pot. The instructions further cause the processor circuit to determine a game result for the wagering game. The instructions further cause the processor circuit to, based on the game result comprising a first game result, allocate a second portion of the wager to a second progressive pot. The instructions further cause the processor circuit to, based on the game result comprising a second game result, award a portion of the first progressive pot to a player of the wagering game. The instructions further cause the processor circuit to, based on the game result comprising a third game result, award a portion of the second progressive pot to the player.

According to some embodiments a video poker gaming device includes a processor circuit and a memory including machine-readable instructions. When executed by the processor circuit, the instructions cause the processor circuit to receive a wager for a video poker wagering game at a gaming device. The instructions further cause the processor circuit to determine a game result for the wagering game, the game result comprising a poker hand. The instructions further cause the processor circuit to, based on the poker hand comprising a first winning poker hand, allocate a first portion of the wager to a progressive pot and award a first base game award to a player of the wagering game. The instructions further cause the processor circuit to, based on the poker hand comprising a second winning poker hand better than the first winning poker hand, award a second base game award and a portion of the progressive pot to the player.

According to some embodiments, a method includes allocating a first portion of a wager for a wagering game at a gaming device to a first progressive pot. The method further includes determining a game result for the wagering game. The method further includes, based on the game result comprising a first game result, allocating a second portion of the wager to a second progressive pot. The method further includes, based on the game result comprising a second game result, awarding a portion of the first progressive pot to a player of the wagering game. The method further includes, based on the game result comprising a third game result, awarding a portion of the second progressive pot to the player.

DETAILED DESCRIPTION

Embodiments described herein relate to game play features with electronic wagering games, and in particular to a competitive wagering game at a plurality of gaming device in a gaming environment, such as in a casino environment, and related devices, systems, and methods.

According to some embodiments, a system may determine a gaming device of a plurality of gaming devices and transmit a message to the gaming device, the message including an invitation to participate in a competitive wagering game. In response to an acceptance of the respective invitation, the gaming device is included in a plurality of active gaming devices and a competitive wagering game is initiated including a plurality of wagering games at the active gaming devices. A plurality of base game results are generated and it is determined whether each base game result is a winning base game result. A winning competitive game result is also selected from the plurality of base game results for the competitive wagering game. For each winning base game result, a base award value is provided at the corresponding gaming device, and a competitive game award is provided at the gaming device associated with the winning competitive game result. These and other aspects will be described in greater detail below.

Figure 1:
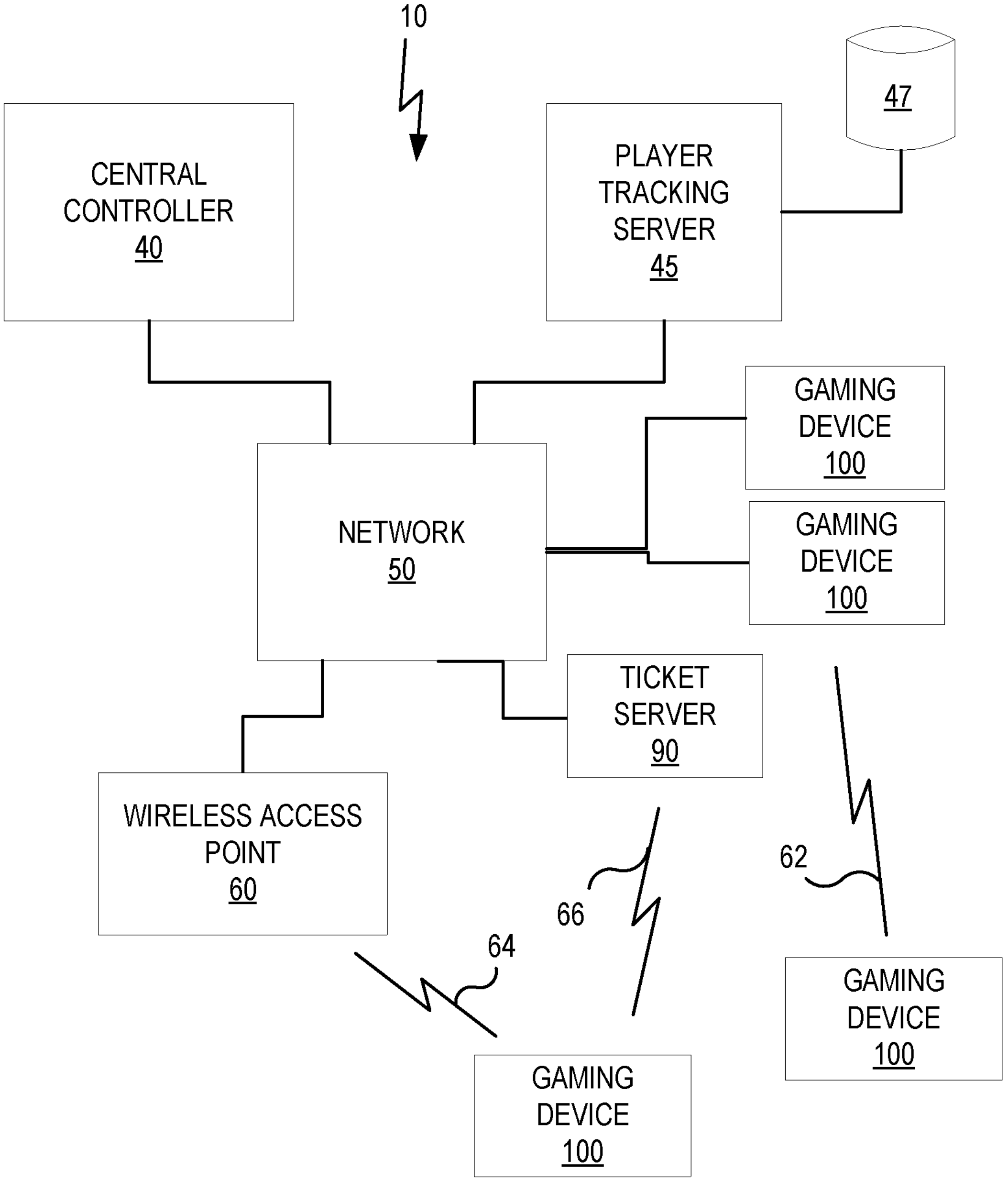
FIG. 1 is a schematic block diagram illustrating a network configuration for a plurality of gaming devices according to some embodiments.

Referring now to FIG. 1, a gaming system 10 including a plurality of gaming devices 100 is illustrated. As discussed above, the gaming devices 100 may be one type of a variety of different types of gaming devices, such as electronic gaming machines (EGMs), mobile gaming devices, or other devices, for example. The gaming system 10 may be located, for example, on the premises of a gaming establishment, such as a casino. The gaming devices 100, which are typically situated on a casino floor, may be in communication with each other and/or at least one central controller 40 through a data communication network 50 that may include a remote communication link. The data communication network 50 may be a private data communication network that is operated, for example, by the gaming facility that operates the gaming devices 100. Communications over the data communication network 50 may be encrypted for security. The central controller 40 may be any suitable server or computing device which includes at least one processing circuit and at least one memory or storage device. Each gaming device 100 may include a processing circuit that transmits and receives events, messages, commands or any other suitable data or signal between the gaming device 100 and the central controller 40. The gaming device processing circuit is operable to execute such communicated events, messages or commands in conjunction with the operation of the gaming device 100. Moreover, the processing circuit of the central controller 40 is configured to transmit and receive events, messages, commands or any other suitable data or signal between the central controller 40 and each of the individual gaming devices 100. In some embodiments, one or more of the functions of the central controller 40 may be performed by one or more gaming device processing circuits. Moreover, in some embodiments, one or more of the functions of one or more gaming device processing circuits as disclosed herein may be performed by the central controller 40.

A wireless access point 60 provides wireless access to the data communication network 50. The wireless access point 60 may be connected to the data communication network 50 as illustrated in FIG. 1, and/or may be connected directly to the central controller 40 or another server connected to the data communication network 50.

A player tracking server 45 may also be connected through the data communication network 50. The player tracking server 45 may manage a player tracking account that tracks the player's gameplay and spending and/or other player preferences and customizations, manages loyalty awards for the player, manages funds deposited or advanced on behalf of the player, and other functions. Player information managed by the player tracking server 45 may be stored in a player information database 47.

As further illustrated in FIG. 1, the gaming system 10 may include a ticket server 90 that is configured to print and/or dispense wagering tickets. The ticket server 90 may be in communication with the central controller 40 through the data communication network 50. Each ticket server 90 may include a processing circuit that transmits and receives events, messages, commands or any other suitable data or signal between the ticket server 90 and the central controller 40. The ticket server 90 processing circuit may be operable to execute such communicated events, messages or commands in conjunction with the operation of the ticket server 90. Moreover, in some embodiments, one or more of the functions of one or more ticket server 90 processing circuits as disclosed herein may be performed by the central controller 40.

The gaming devices 100 communicate with one or more elements of the gaming system 10 to coordinate providing wagering games and other functionality. For example, in some embodiments, the gaming device 100 may communicate directly with the ticket server 90 over a wireless interface 62, which may be a WiFi link, a Bluetooth link, a near field communications (NFC) link, etc. In other embodiments, the gaming device 100 may communicate with the data communication network 50 (and devices connected thereto, including other gaming devices 100) over a wireless interface 64 with the wireless access point 60. The wireless interface 64 may include a WiFi link, a Bluetooth link, an NFC link, etc. In still further embodiments, the gaming devices 100 may communicate simultaneously with both the ticket server 90 over the wireless interface 66 and the wireless access point 60 over the wireless interface 64. Some embodiments provide that gaming devices 100 may communicate with other gaming devices over a wireless interface 64. In these embodiments, wireless interface 62, wireless interface 64 and wireless interface 66 may use different communication protocols and/or different communication resources, such as different frequencies, time slots, spreading codes, etc.

Figure 2A:
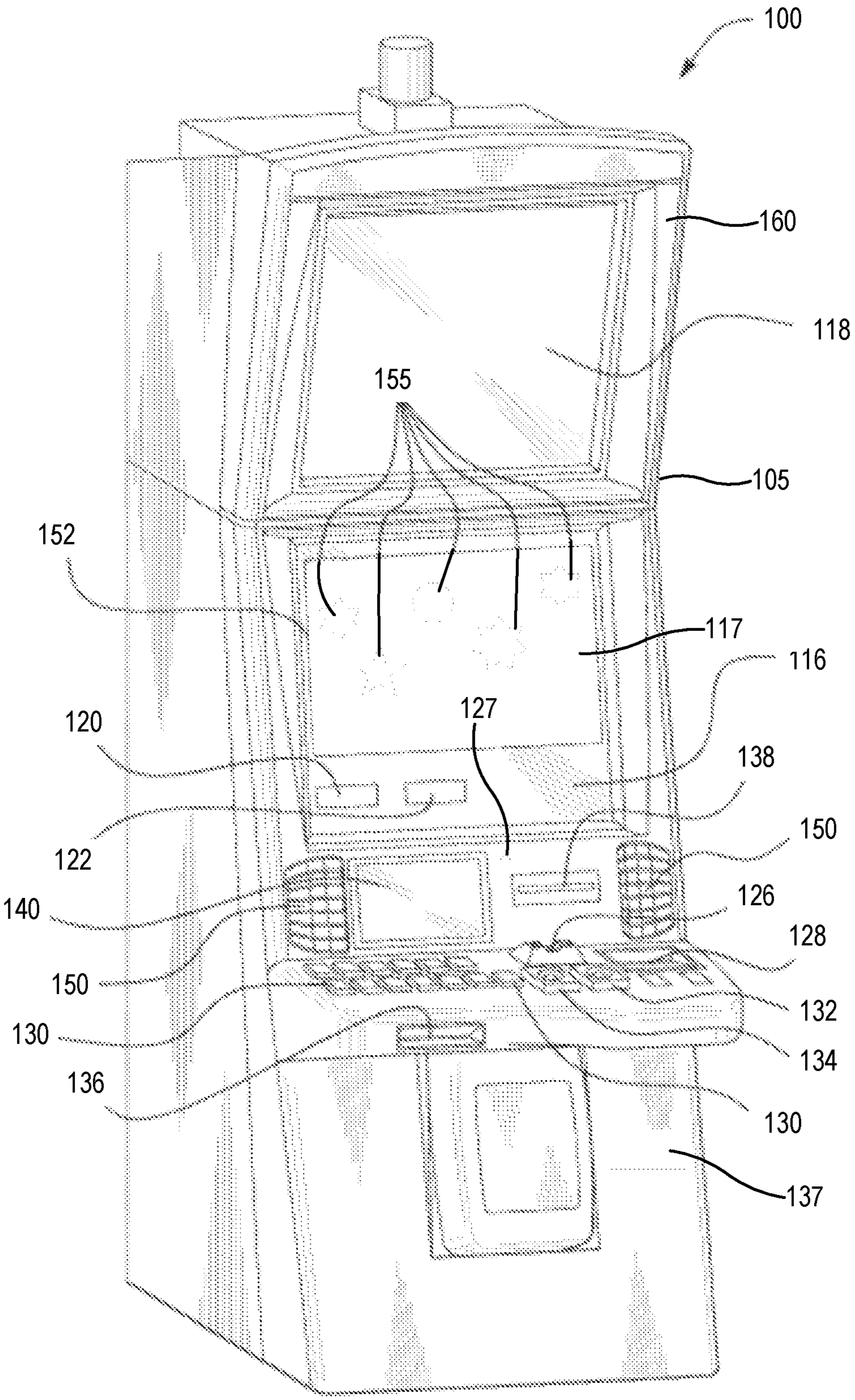
FIG. 2A is a perspective view of a gaming device that can be configured according to some embodiments.
Figure 2B:
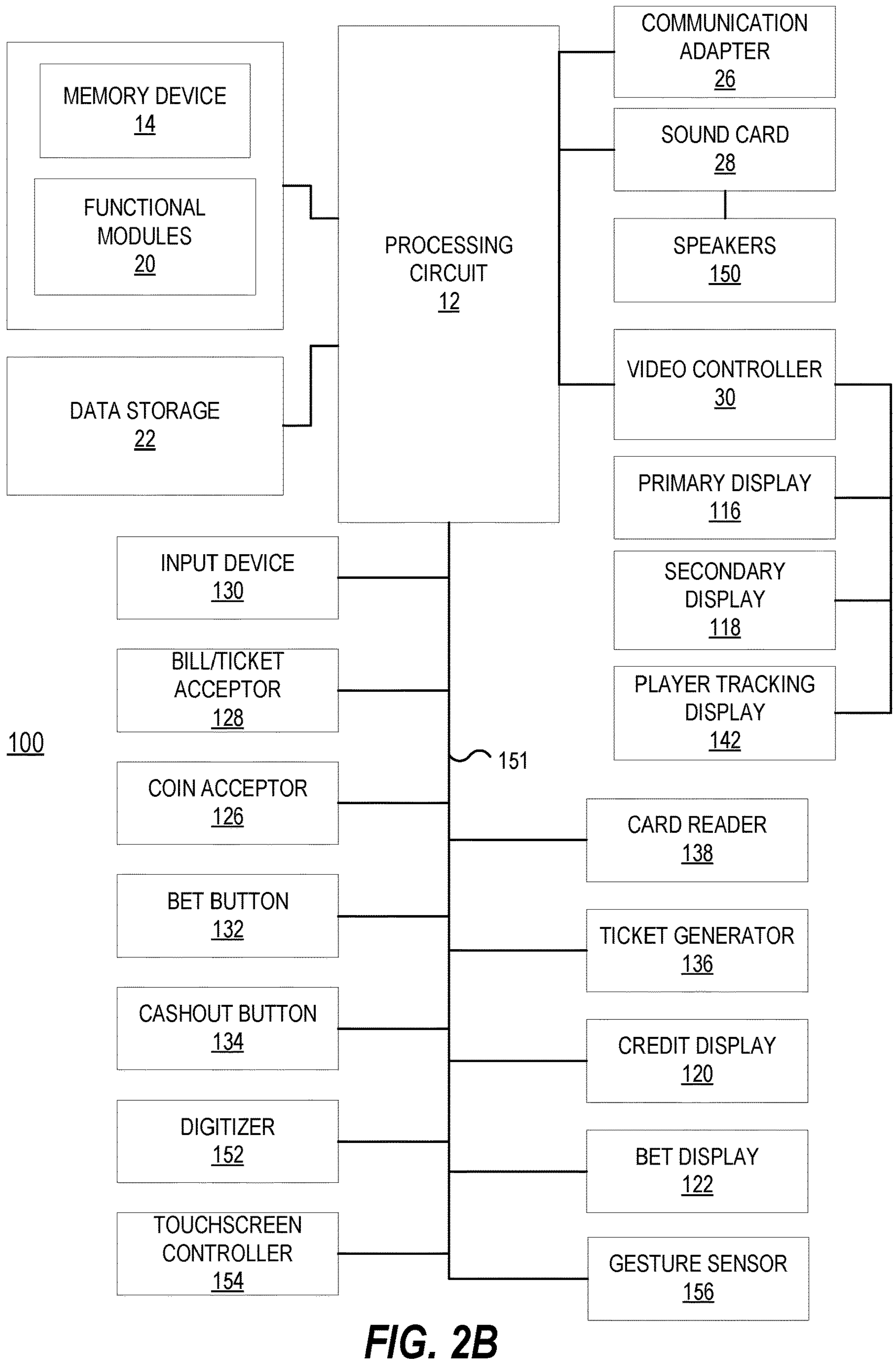
FIG. 2B is a schematic block diagram illustrating an electronic configuration for a gaming device according to some embodiments.
Figure 2C:
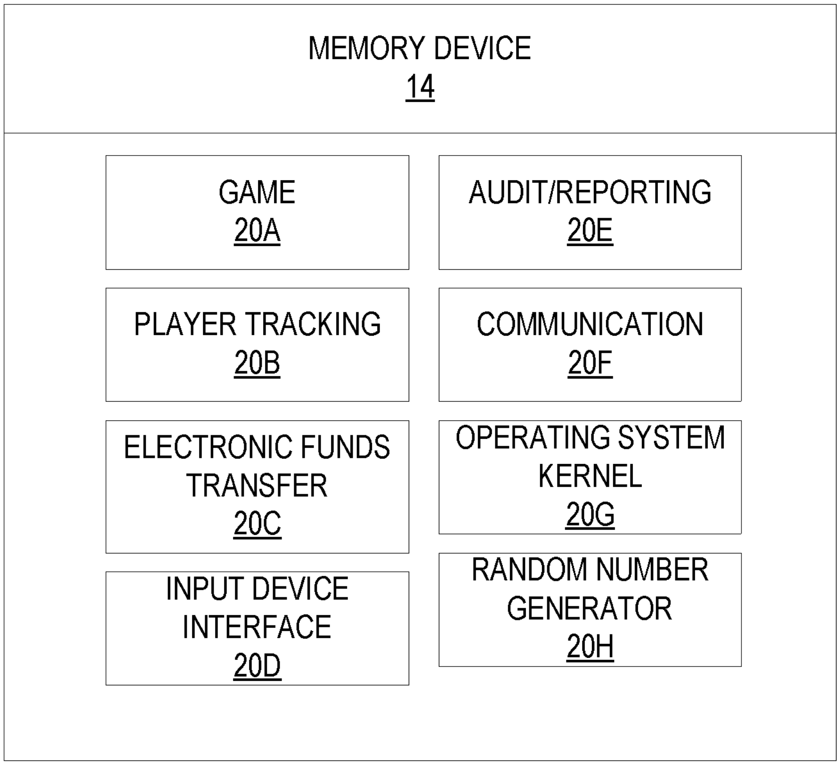
FIG. 2C is a schematic block diagram that illustrates various functional modules of a gaming device according to some embodiments.

Embodiments herein may include different types of gaming devices. One example of a gaming device includes a gaming device 100 that can use gesture and/or touch-based inputs according to various embodiments is illustrated in FIGS. 2A, 2B, and 2C in which FIG. 2A is a perspective view of a gaming device 100 illustrating various physical features of the device, FIG. 2B is a functional block diagram that schematically illustrates an electronic relationship of various elements of the gaming device 100, and FIG. 2C illustrates various functional modules that can be stored in a memory device of the gaming device 100. The embodiments shown in FIGS. 2A to 2C are provided as examples for illustrative purposes only. It will be appreciated that gaming devices may come in many different shapes, sizes, layouts, form factors, and configurations, and with varying numbers and types of input and output devices, and that embodiments are not limited to the particular gaming device structures described herein.

Gaming devices 100 typically include a number of standard features, many of which are illustrated in FIGS. 2A and 2B. For example, referring to FIG. 2A, a gaming device 100 (which is an EGM 160 in this embodiment) may include a support structure, housing 105 (e.g., cabinet) which provides support for a plurality of displays, inputs, outputs, controls and other features that enable a player to interact with the gaming device 100.

The gaming device 100 illustrated in FIG. 2A includes a number of display devices, including a primary display device 116 located in a central portion of the housing 105 and a secondary display device 118 located in an upper portion of the housing 105. A plurality of game components 155 are displayed on a display screen 117 of the primary display device 116. It will be appreciated that one or more of the display devices 116, 118 may be omitted, or that the display devices 116, 118 may be combined into a single display device. The gaming device 100 may further include a player tracking display 142, a credit display 120, and a bet display 122. The credit display 120 displays a player's current number of credits, cash, account balance or the equivalent. The bet display 122 displays a player's amount wagered. Locations of these displays are merely illustrative as any of these displays may be located anywhere on the gaming device 100.

The player tracking display 142 may be used to display a service window that allows the player to interact with, for example, their player loyalty account to obtain features, bonuses, comps, etc. In other embodiments, additional display screens may be provided beyond those illustrated in FIG. 2A. In some embodiments, one or more of the player tracking display 142, the credit display 120 and the bet display 122 may be displayed in one or more portions of one or more other displays that display other game related visual content. For example, one or more of the player tracking display 142, the credit display 120 and the bet display 122 may be displayed in a picture in a picture on one or more displays.

The gaming device 100 may further include a number of input devices 130 that allow a player to provide various inputs to the gaming device 100, either before, during or after a game has been played. The gaming device may further include a game play initiation button 132 and a cashout button 134. The cashout button 134 is utilized to receive a cash payment or any other suitable form of payment corresponding to a quantity of remaining credits of a credit display.

In some embodiments, one or more input devices of the gaming device 100 are one or more game play activation devices that are each used to initiate a play of a game on the gaming device 100 or a sequence of events associated with the gaming device 100 following appropriate funding of the gaming device 100. The example gaming device 100 illustrated in FIGS. 2A and 2B includes a game play activation device in the form of a game play initiation button 132. It should be appreciated that, in other embodiments, the gaming device 100 begins game play automatically upon appropriate funding rather than upon utilization of the game play activation device.

In some embodiments, one or more input device 130 of the gaming device 100 may include wagering or betting functionality. For example, a maximum wagering or betting function may be provided that, when utilized, causes a maximum wager to be placed. Another such wagering or betting function is a repeat the bet device that, when utilized, causes the previously-placed wager to be placed. A further such wagering or betting function is a bet one function. A bet is placed upon utilization of the bet one function. The bet is increased by one credit each time the bet one device is utilized. Upon the utilization of the bet one function, a quantity of credits shown in a credit display (as described below) decreases by one, and a number of credits shown in a bet display (as described below) increases by one.

In some embodiments, as shown in FIG. 2B, the input device(s) 130 may include and/or interact with additional components, such as gesture sensors 156 for gesture input devices, and/or a touch-sensitive display that includes a digitizer 152 and a touchscreen controller 154 for touch input devices, as disclosed herein. The player may interact with the gaming device 100 by touching virtual buttons on one or more of the display devices 116, 118, 140. Accordingly, any of the above-described input devices, such as the input device 130, the game play initiation button 132 and/or the cashout button 134 may be provided as virtual buttons or regions on one or more of the display devices 116, 118, 140.

Referring briefly to FIG. 2B, operation of the primary display device 116, the secondary display device 118 and the player tracking display 142 may be controlled by a video controller 30 that receives video data from a processing circuit 12 or directly from a memory device 14 and displays the video data on the display screen. The credit display 120 and the bet display 122 are typically implemented as simple liquid crystal display (LCD) or light emitting diode (LED) displays that display a number of credits available for wagering and a number of credits being wagered on a particular game. Accordingly, the credit display 120 and the bet display 122 may be driven directly by the processing circuit 12. In some embodiments however, the credit display 120 and/or the bet display 122 may be driven by the video controller 30.

Referring again to FIG. 2A, the display devices 116, 118, 140 may include, without limitation: a cathode ray tube, a plasma display, an LCD, a display based on LEDs, a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display devices 116, 118, 140 may include a touch-screen with an associated touchscreen controller 154 and digitizer 152. The display devices 116, 118, 140 may be of any suitable size, shape, and/or configuration. The display devices 116, 118, 140 may include flat or curved display surfaces.

The display devices 116, 118, 140 and video controller 30 of the gaming device 100 are generally configured to display one or more game and/or non-game images, symbols, and indicia. In certain embodiments, the display devices 116, 118, 140 of the gaming device 100 are configured to display any suitable visual representation or exhibition of the movement of objects; dynamic lighting; video images; images of people, characters, places, things, and faces of cards; and the like. In certain embodiments, the display devices 116, 118, 140 of the gaming device 100 are configured to display one or more virtual reels, one or more virtual wheels, and/or one or more virtual dice. In other embodiments, certain of the displayed images, symbols, and indicia are in mechanical form. That is, in these embodiments, the display device 116, 118, 140 includes any electromechanical device, such as one or more rotatable wheels, one or more reels, and/or one or more dice, configured to display at least one or a plurality of game or other suitable images, symbols, or indicia.

The gaming device 100 also includes various features that enable a player to deposit credits in the gaming device 100 and withdraw credits from the gaming device 100, such as in the form of a payout of winnings, credits, etc. For example, the gaming device 100 may include a bill/ticket dispenser 136, a bill/ticket acceptor 128, and a coin acceptor 126 that allows the player to deposit coins into the gaming device 100.

As illustrated in FIG. 2A, the gaming device 100 may also include a currency dispenser 137 that may include a note dispenser configured to dispense paper currency and/or a coin generator configured to dispense coins or tokens in a coin payout tray.

The gaming device 100 may further include one or more speakers 150 controlled by one or more sound cards 28 (FIG. 2B). The gaming device 100 illustrated in FIG. 2A includes a pair of speakers 150. In other embodiments, additional speakers, such as surround sound speakers, may be provided within or on the housing 105. Moreover, the gaming device 100 may include built-in seating with integrated headrest speakers.

In various embodiments, the gaming device 100 may generate dynamic sounds coupled with attractive multimedia images displayed on one or more of the display devices 116, 118, 140 to provide an audio-visual representation or to otherwise display full-motion video with sound to attract players to the gaming device 100 and/or to engage the player during gameplay. In certain embodiments, the gaming device 100 may display a sequence of audio and/or visual attraction messages during idle periods to attract potential players to the gaming device 100. The videos may be customized to provide any appropriate information.

The gaming device 100 may further include a card reader 138 that is configured to read magnetic stripe cards, such as player loyalty/tracking cards, chip cards, and the like. In some embodiments, a player may insert an identification card into a card reader of the gaming device. In some embodiments, the identification card is a smart card having a programmed microchip or a magnetic strip coded with a player's identification, credit totals (or related data) and other relevant information. In other embodiments, a player may carry a portable device, such as a cell phone, a radio frequency identification tag or any other suitable wireless device, which communicates a player's identification, credit totals (or related data) and other relevant information to the gaming device. In some embodiments, money may be transferred to a gaming device through electronic funds transfer. When a player funds the gaming device, the processing circuit determines the amount of funds entered and displays the corresponding amount on the credit or other suitable display as described above.

In some embodiments, the gaming device 100 may include an electronic payout device or module configured to fund an electronically recordable identification card or smart card or a bank or other account via an electronic funds transfer to or from the gaming device 100.

FIG. 2B is a block diagram that illustrates logical and functional relationships between various components of a gaming device 100. It should also be understood that components described in FIG. 2B may also be used in other computing devices, as desired, such as mobile computing devices for example. As shown in FIG. 2B, the gaming device 100 may include a processing circuit 12 that controls operations of the gaming device 100. Although illustrated as a single processing circuit, multiple special purpose and/or general purpose processors and/or processor cores may be provided in the gaming device 100. For example, the gaming device 100 may include one or more of a video processor, a signal processor, a sound processor and/or a communication controller that performs one or more control functions within the gaming device 100. The processing circuit 12 may be variously referred to as a "controller," "microcontroller," "microprocessor" or simply a "computer." The processor may further include one or more application-specific integrated circuits (ASICs).

Various components of the gaming device 100 are illustrated in FIG. 2B as being connected to the processing circuit 12. It will be appreciated that the components may be connected to the processing circuit 12 through a system bus 151, a communication bus and controller, such as a universal serial bus (USB) controller and USB bus, a network interface, or any other suitable type of connection.

The gaming device 100 further includes a memory device 14 that stores one or more functional modules 20. Various functional modules 20 of the gaming device 100 will be described in more detail below in connection with FIG. 2D.

The memory device 14 may store program code and instructions, executable by the processing circuit 12, to control the gaming device 100. The memory device 14 may also store other data such as image data, event data, player input data, random or pseudo-random number generators, pay-table data or information and applicable game rules that relate to the play of the gaming device. The memory device 14 may include random access memory (RAM), which can include non-volatile RAM (NVRAM), magnetic RAM (ARAM), ferroelectric RAM (FeRAM) and other forms as commonly understood in the gaming industry. In some embodiments, the memory device 14 may include read only memory (ROM). In some embodiments, the memory device 14 may include flash memory and/or EEPROM (electrically erasable programmable read only memory). Any other suitable magnetic, optical and/or semiconductor memory may operate in conjunction with the gaming device disclosed herein.

The gaming device 100 may further include a data storage 22, such as a hard disk drive or flash memory. The data storage 22 may store program data, player data, audit trail data or any other type of data. The data storage 22 may include a detachable or removable memory device, including, but not limited to, a suitable cartridge, disk, CD ROM, Digital Video Disc ("DVD") or USB memory device.

The gaming device 100 may include a communication adapter 26 that enables the gaming device 100 to communicate with remote devices over a wired and/or wireless communication network, such as a local area network (LAN), wide area network (WAN), cellular communication network, or other data communication network. The communication adapter 26 may further include circuitry for supporting short range wireless communication protocols, such as Bluetooth and/or NFC that enable the gaming device 100 to communicate, for example, with a mobile communication device operated by a player.

The gaming device 100 may include one or more internal or external communication ports that enable the processing circuit 12 to communicate with and to operate with internal or external peripheral devices, such as eye tracking devices, position tracking devices, cameras, accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, Small Computer System Interface ("SCSI") ports, solenoids, speakers, thumb drives, ticket readers, touch screens, trackballs, touchpads, wheels, and wireless communication devices. In some embodiments, internal or external peripheral devices may communicate with the processing circuit through a USB hub (not shown) connected to the processing circuit 12.

In some embodiments, the gaming device 100 may include a sensor, such as a camera 127, in communication with the processing circuit 12 (and possibly controlled by the processing circuit 12) that is selectively positioned to acquire an image of a player actively using the gaming device 100 and/or the surrounding area of the gaming device 100. In one embodiment, the camera 127 may be configured to selectively acquire still or moving (e.g., video) images and may be configured to acquire the images in either an analog, digital or other suitable format. The display devices 116, 118, 140 may be configured to display the image acquired by the camera 127 as well as display the visible manifestation of the game in split screen or picture-in-picture fashion. For example, the camera 127 may acquire an image of the player and the processing circuit 12 may incorporate that image into the primary and/or secondary game as a game image, symbol or indicia.

Various functional modules of that may be stored in a memory device 14 of a gaming device 100 are illustrated in FIG. 2C. Referring to FIG. 2C, the gaming device 100 may include in the memory device 14 a game module 20A that includes program instructions and/or data for operating a hybrid wagering game as described herein. The gaming device 100 may further include a player tracking module 20B, an electronic funds transfer module 20C, an input device interface 20D, an audit/reporting module 20E, a communication module 20F, an operating system kernel 20G and a random number generator 20H. The player tracking module 20B keeps track of the play of a player. The electronic funds transfer module 20C communicates with a back end server or financial institution to transfer funds to and from an account associated with the player. The input device interface 20D interacts with input devices, such as the input device 130, as described in more detail below. The communication module 20F enables the gaming device 100 to communicate with remote servers and other gaming devices using various secure communication interfaces. The operating system kernel 20G controls the overall operation of the gaming device 100, including the loading and operation of other modules. The random number generator 20H generates random or pseudorandom numbers for use in the operation of the hybrid games described herein.

In some embodiments, a gaming device 100 includes a personal device, such as a desktop computer, a laptop computer, a mobile device, a tablet computer or computing device, a personal digital assistant (PDA), or other portable computing devices. In some embodiments, the gaming device 100 may be operable over a wireless network, such as part of a wireless gaming system. In such embodiments, the gaming machine may be a hand-held device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission.

Figure 2D:
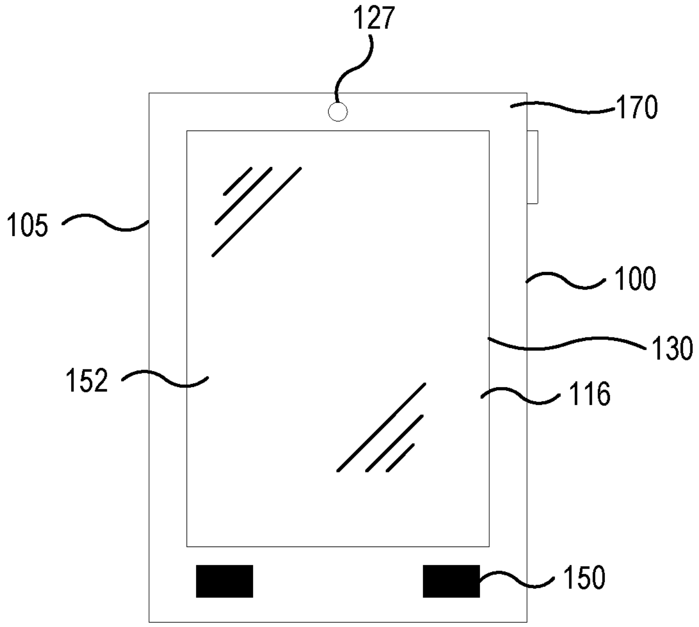
FIG. 2D is perspective view of a gaming device that can be configured according to some embodiments.

For example, referring to FIG. 2D, a gaming device 100 (which is a mobile gaming device 170 in this embodiment) may be implemented as a handheld device including a compact housing 105 on which is mounted a touchscreen display device 116 including a digitizer 152. As described in greater detail with respect to FIG. 3 below, one or more input devices 130 may be included for providing functionality of for embodiments described herein. A camera 127 may be provided in a front face of the housing 105. The housing 105 may include one or more speakers 150. In the gaming device 100, various input buttons described above, such as the cashout button, gameplay activation button, etc., may be implemented as soft buttons on the touchscreen display device 116 and/or input device 130. In this embodiment, the input device 130 is integrated into the touchscreen display device 116, but it should be understood that the input device may also, or alternatively, be separate from the display device 116. Moreover, the gaming device 100 may omit certain features, such as a bill acceptor, a ticket generator, a coin acceptor or dispenser, a card reader, secondary displays, a bet display, a credit display, etc. Credits can be deposited in or transferred from the gaming device 100 electronically.

Figure 2E:
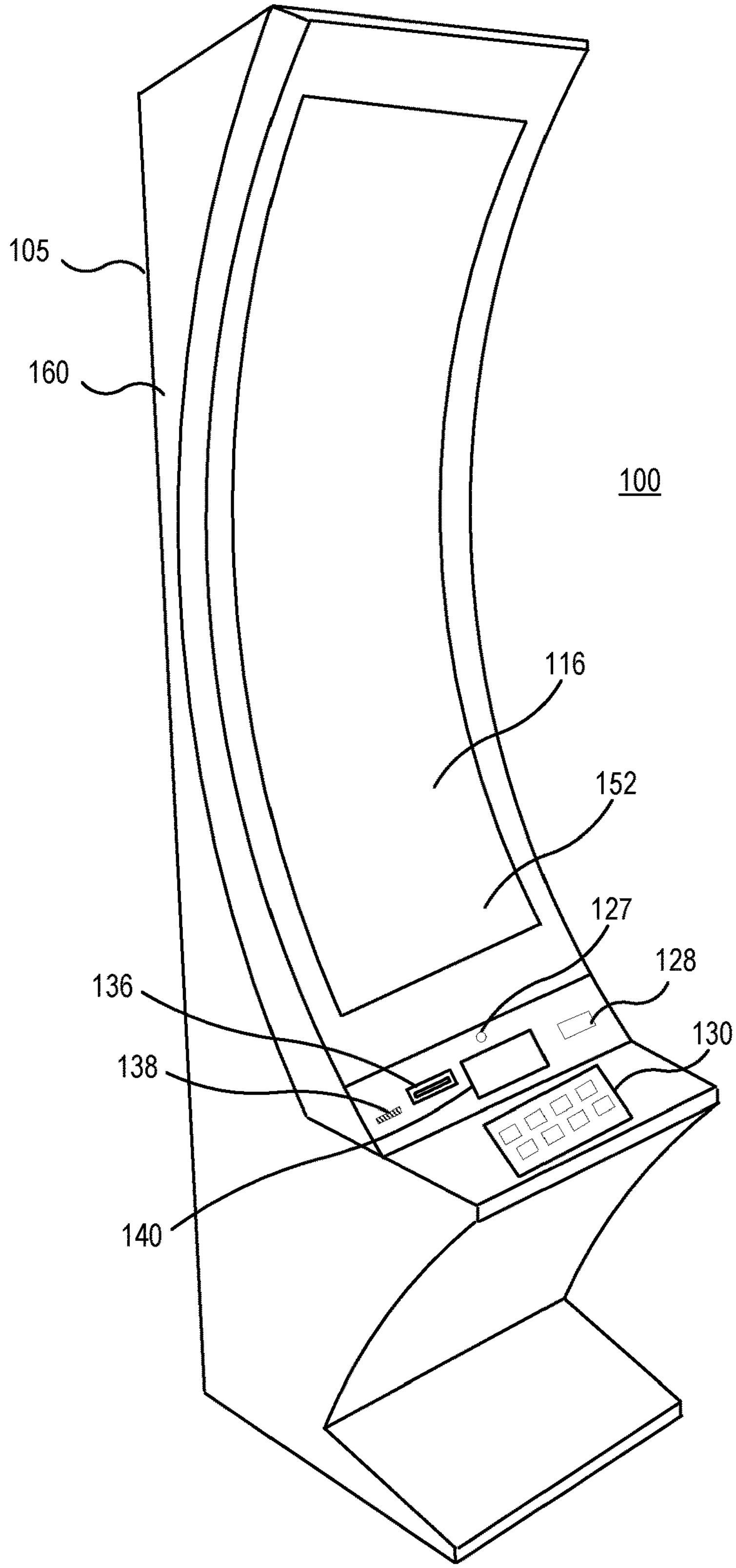
FIG. 2E is a perspective view of a gaming device according to further embodiments.

FIG. 2E illustrates a standalone gaming device 100 (which is an EGM 160 in this embodiment) having a different form factor from the EGM 160 illustrated in FIG. 2A. In particular, the gaming device 100 is characterized by having a large, high aspect ratio, curved primary display device 116 provided in the housing 105, with no secondary display device. The primary display device 116 may include a digitizer 152 to allow touchscreen interaction with the primary display device 116. The gaming device 100 may further include a player tracking display 142, an input device 130, a bill/ticket acceptor 128, a card reader 138, and a bill/ticket dispenser 136. The gaming device 100 may further include one or more cameras 127 to enable facial recognition and/or motion tracking.

Although illustrated as certain gaming devices, such as electronic gaming machines (EGMs) and mobile gaming devices, functions and/or operations as described herein may also include wagering stations that may include electronic game tables, conventional game tables including those involving cards, dice and/or roulette, and/or other wagering stations such as sports book stations, video poker games, skill-based games, virtual casino-style table games, or other casino or non-casino style games. Further, gaming devices according to embodiments herein may be implemented using other computing devices and mobile devices, such as smart phones, tablets, and/or personal computers, among others.

Figure 3A:
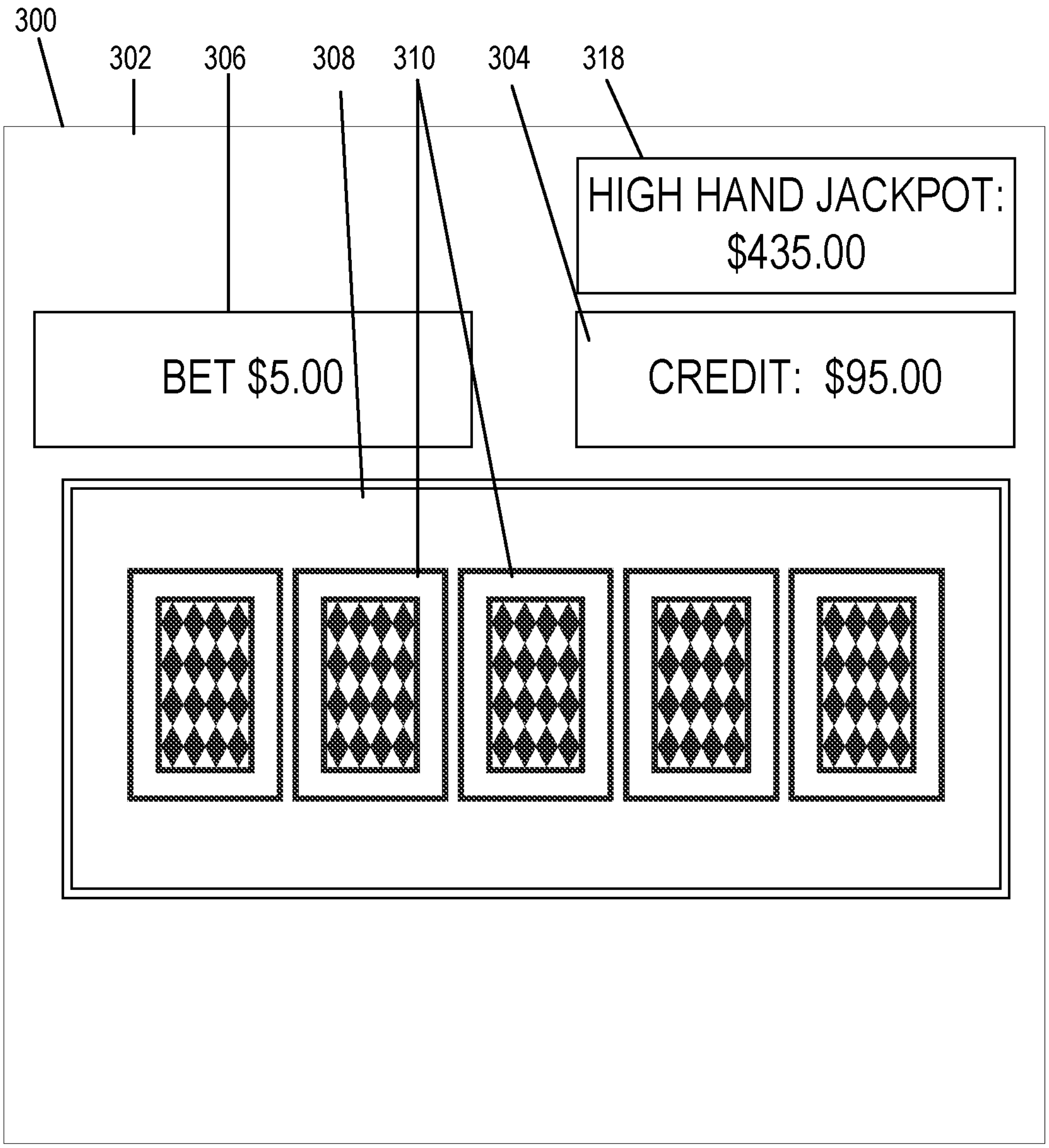
FIGS. 3A-3C are diagrams of a graphical user interface (GUI) for a video poker-style wagering game including an event-based progressive feature, according to some embodiments.
Figure 3B:
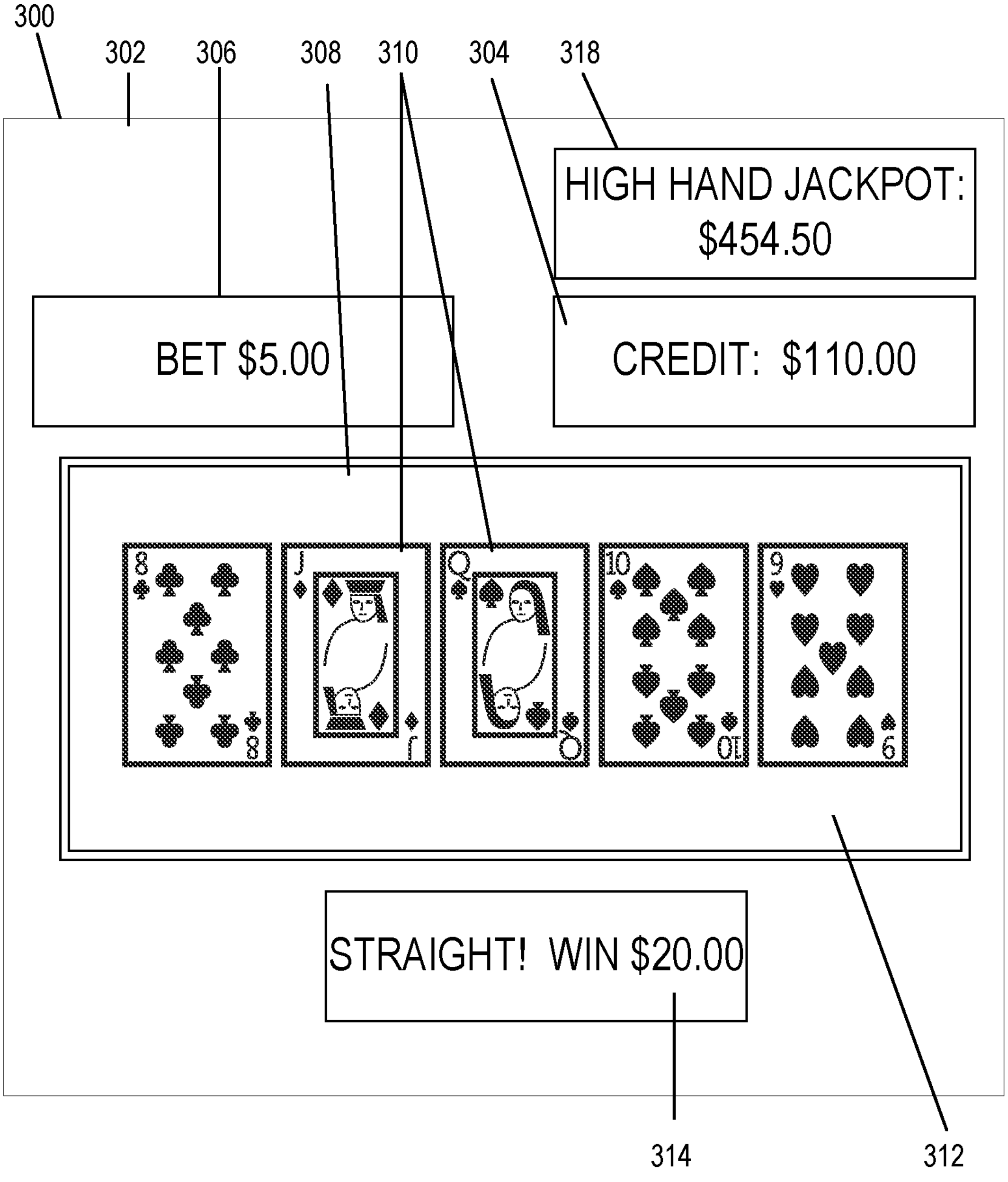
Figure 3C:
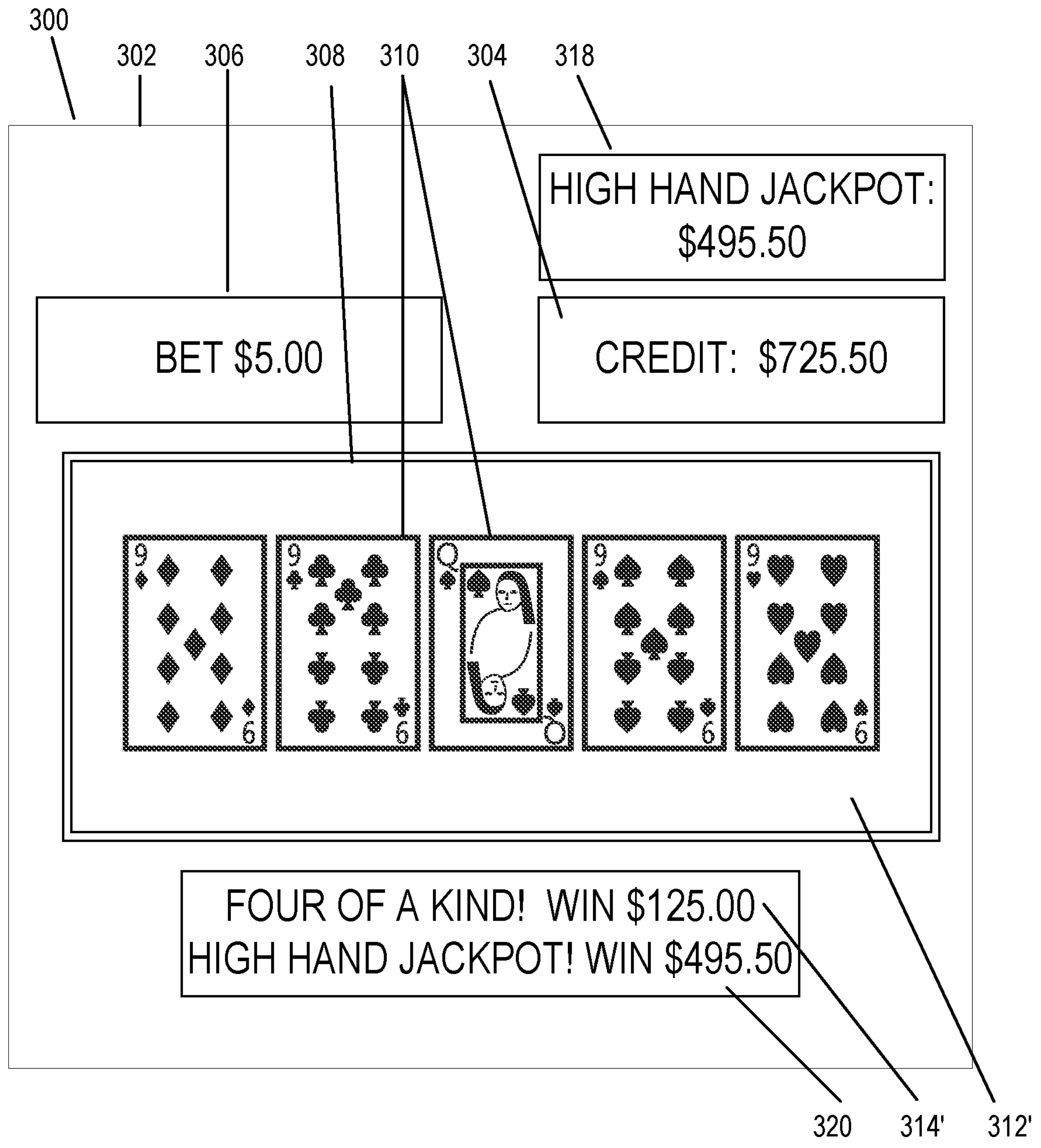

FIGS. 3A-3C are diagrams of a graphical user interface (GUI) 302 of an EGM 300 for a video poker-style wagering game including an event-based progressive feature, according to some embodiments. The GUI 302 may include a credit meter 304, a bet button 306, a game board 308, and/or additional graphical elements as desired. The game board 308 in this example includes a plurality of video poker cards 310 arranged to form a poker hand, with better hands resulting in progressively higher game awards. As used herein in the context of video poker, the term "better hand" refers to a poker hand that beats or defeats another hand, e.g., three of a kind being a better hand than two pair. In this example, the games may be resolved according to standard poker hand rankings, but it should be understood that other types of rankings, game rules, and/or game types can be used.

In addition, an event-based progressive meter 316 including an event-based progressive pot 318 (i.e., called a "high hand jackpot" in this example) may also displayed by the GUI 302. As shown by FIG. 3A, a wager is placed via pressing the bet button 304 via a touchscreen input of the EGM display and/or via another input device of the EGM. Referring now to FIG. 3B, a game result 312 (i.e., poker hand) is determined for the wagering game, and a base game award 314 is paid out according to a predetermined paytable. In response to the game result 312 meeting a threshold game result (e.g., three-of-a-kind or better in this example), a portion of the wager (e.g., $0.50) is also allocated to the event-based progressive pot 318. In this example, the event-based progressive pot may be funded by a plurality of EGMs, for example, by all connected EGMs providing the same type of wagering game within a certain jurisdiction, casino network, or other defined group. In this manner, the event-based progressive pot 318 can grow quickly as the EGM 300 and other EGMs produce winning results that meet the threshold. In some examples, the allocation of the portion of the wager to the progressive pot 318 may be further based on the wager meeting a minimum wager threshold, such as the wager being a maximum wager for the EGM 300 and/or wagering game.

As shown by FIG. 3C, in response to a subsequent game result 312' meeting a second threshold game result (e.g., four-of-a-kind or better), another base game award 314' is paid out according to the predetermined paytable. In this example, the better result for the subsequent game result 312' results in a higher game award 314' than the original base game award 314. In this example, the game awards 314, 314' are based on the wager amount independently of whether a portion of the wager is allocated to the event-based progressive pot 318.

In addition, in response to the game result 312' meeting the second threshold game result, the progressive pot 318 (or a portion thereof) is also awarded as an event-based progressive award 320. In some examples, the award of the progressive pot 318 may also be based on the wager for the game result 312' meeting the minimum wager threshold discussed above.

In some embodiments, an event-based progressive feature may be provided alongside a standard progressive feature. In this regard, FIGS. 4A-4E are diagrams of a GUI 402 of an EGM 400 for a video poker-style wagering game including a standard progressive feature and an event-based progressive feature, according to some embodiments.

The GUI 402 of FIGS. 4A-4E may include a credit meter 404, a bet button 406, a game board 408, including a plurality of video poker cards 410 in this embodiment, and/or additional graphical elements as desired. In this example, the GUI 402 also includes an event-based progressive meter 416 including an event-based progressive pot 418 and a separate standard progressive meter 422 including a standard progressive pot 424.

Figure 4A:
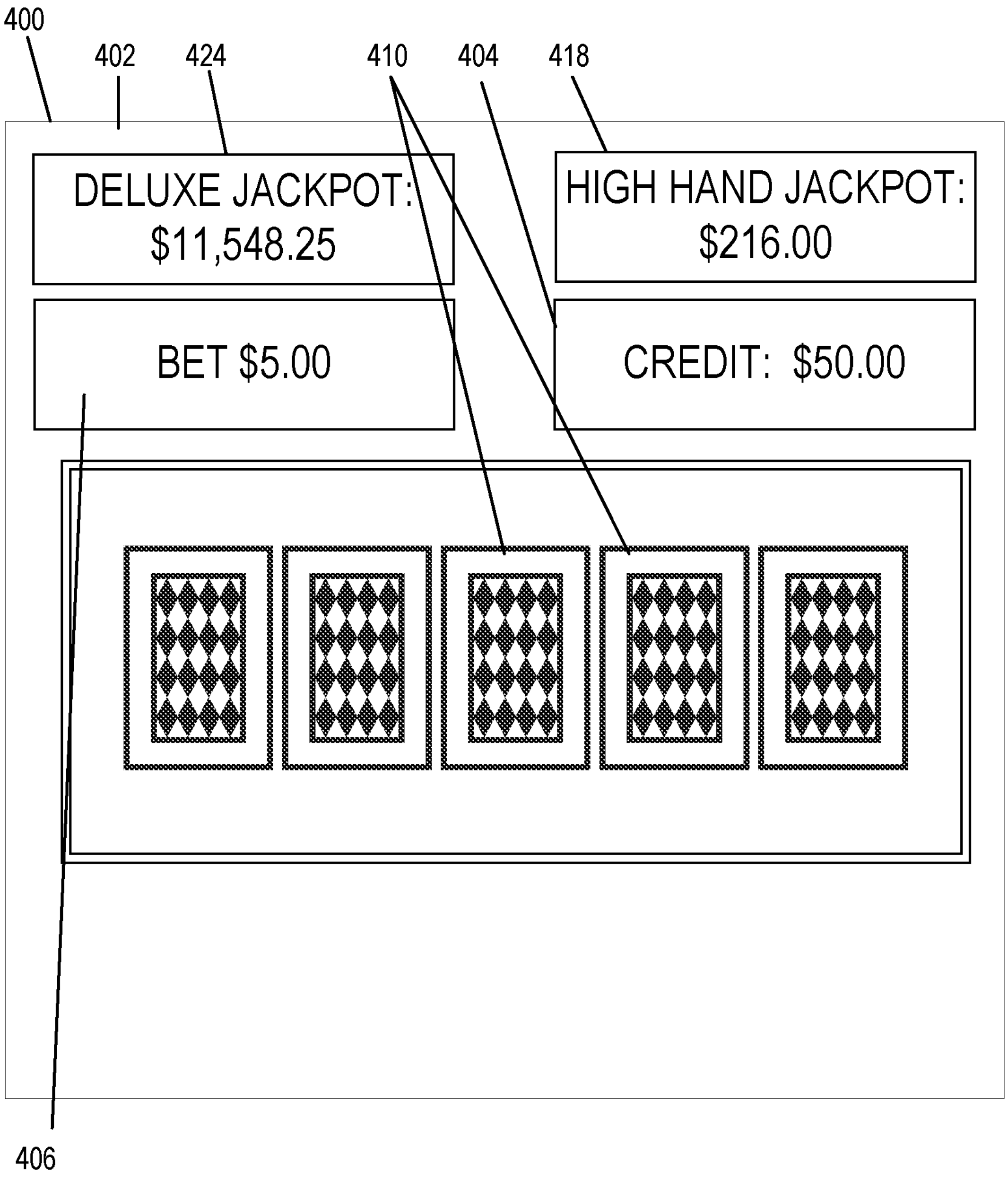
FIGS. 4A-4E are diagrams of a GUI for a video poker-style wagering game including a standard progressive feature and an event-based progressive feature, according to some embodiments.
Figure 4B:
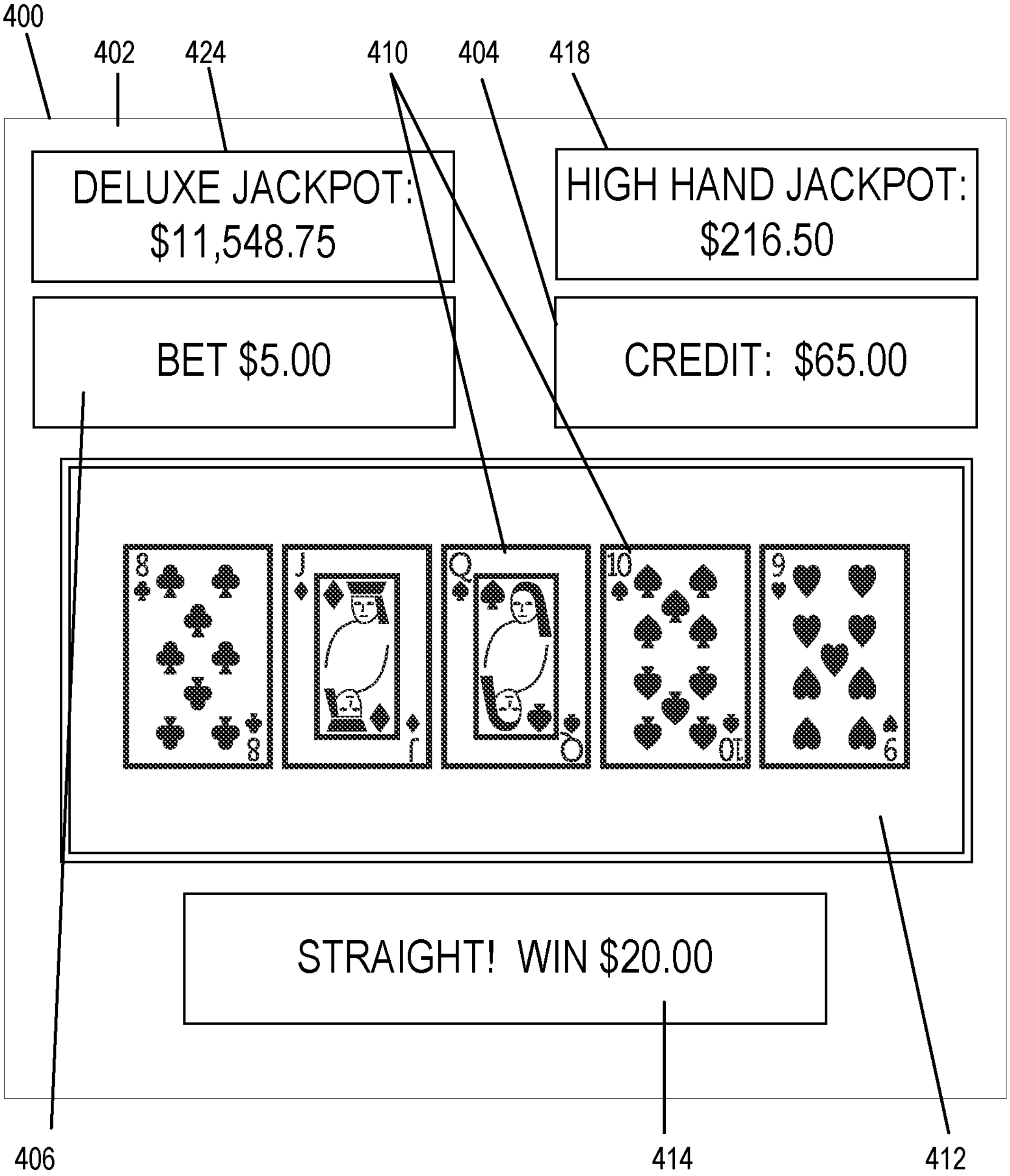

In this example, as shown in FIG. 4A the bet button 404 is configured to place a wager, a portion of which funds the standard progressive pot 422 in response to the wager meeting certain criteria, such as meeting a minimum wager threshold. As shown by FIG. 4B, in response to a winning game result 412, a primary game award 414 is awarded based on a predetermined paytable, and it is also determined whether the game result 412 meets the criteria for awarding the standard progressive pot 422 and/or the event-based progressive pot 418.

In this example, a royal flush will trigger an award of the standard progressive pot 422 and a straight flush or better will trigger an award of the event-based progressive pot 418, with a related straight or flush causing a portion of the wager to fund the event-based progressive pot 418. Accordingly, as shown by FIG. 4B, the winning game result 412 (e.g., a straight) is not sufficient to award the standard progressive pot 422 or the event-based progressive pot 418, but the winning game result 412 is sufficient to fund the event-based progressive pot 418.

Figure 4C:
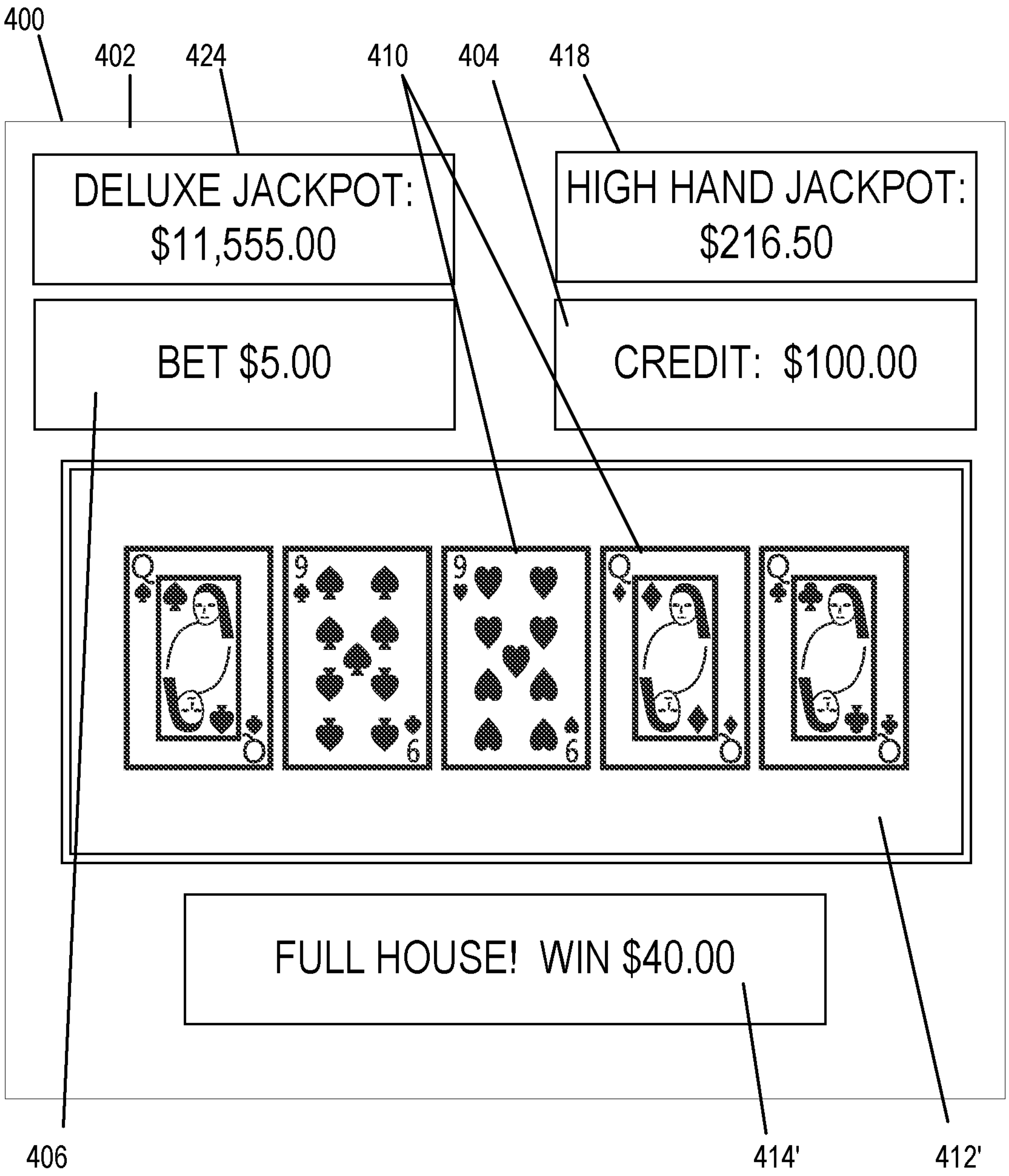

In this example, the event-based progressive pot 418 is funded only in response to specific related results, as defined by the game rules as desired. For example, in this embodiment, only a straight or a flush will cause the event-based progressive pot 418 to be funded. As shown by FIG. 4C, another winning game results 412' (a full house) results in a primary game award 414' being paid, but it not sufficient to trigger a standard progressive win or an event-based progressive win, and also fails to fund the event-based progressive pot 418, despite resulting in a higher primary game award 414' than the primary game award 414 for the straight game result 414 of FIG. 4B. In this example, the qualifying results for funding the event-based progressive pot 418 are based around the straight flush win condition for the event-based progressive feature, with straights and flushes causing the event-based progressive pot 418 to be funded, but with other results, including a full house or four-of-a-kind, failing to cause the event-based progressive pot 418 to be funded. It should also be understood that any number of rules, qualifying results, or other criteria may be used, as desired.

Figure 4D:
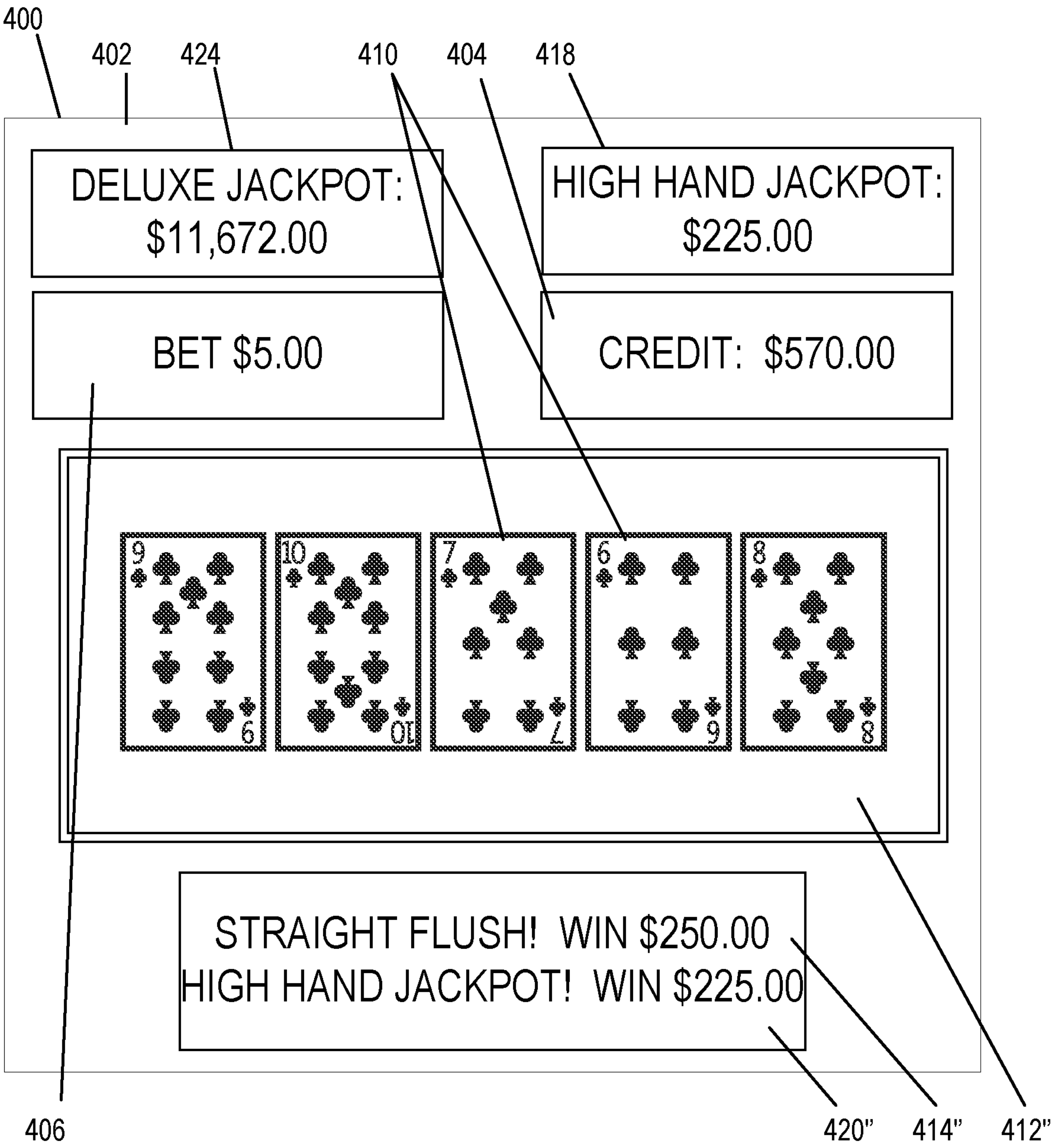
Figure 4E:
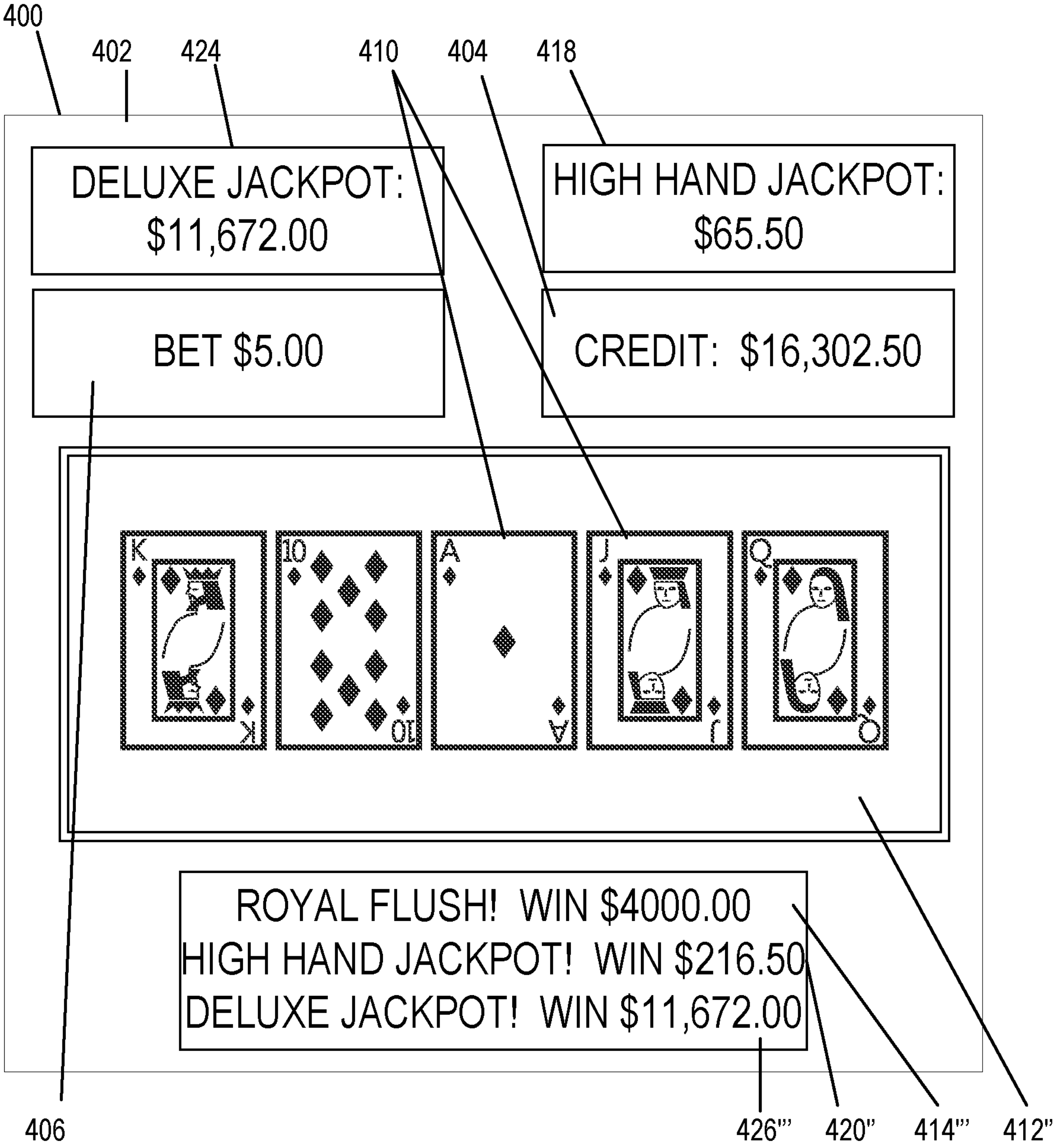

Referring now to FIG. 4D, a subsequent game result 412" (a straight flush) causes a primary game award 414" to be paid according to the predetermined paytable, and the event-based progressive pot to be paid out as an event-based progressive award 420". FIG. 4E illustrates another game result 412'" (a royal flush), which causes a primary game award 414'" to be paid according to the predetermined paytable, and both the event-based progressive pot 418 to be paid out as an event-based progressive award 420'" and the standard progressive pot 424 to be paid out as a standard progressive award 426".

As noted above, the event-based progressive pot 418 and/or standard progressive pot 424 may be funded using a portion of a primary wager amount in this embodiment. In some embodiments, however, one or both progressive pots 418, 424 may be funded in whole or in part by a secondary wager amount (e.g., a side bet) that is separate from the primary wager, as desired, and may or may not include any contribution from the primary wager, as desired.

It should also be understood that the event-based progressive embodiments described herein may be adapted to different types of wagering games. In this regard, FIGS. 5A-5C are diagrams of a GUI 502 of an EGM 500 for a slot-style wagering game including a standard progressive feature and an event-based progressive feature, according to some embodiments.

Figure 5A:
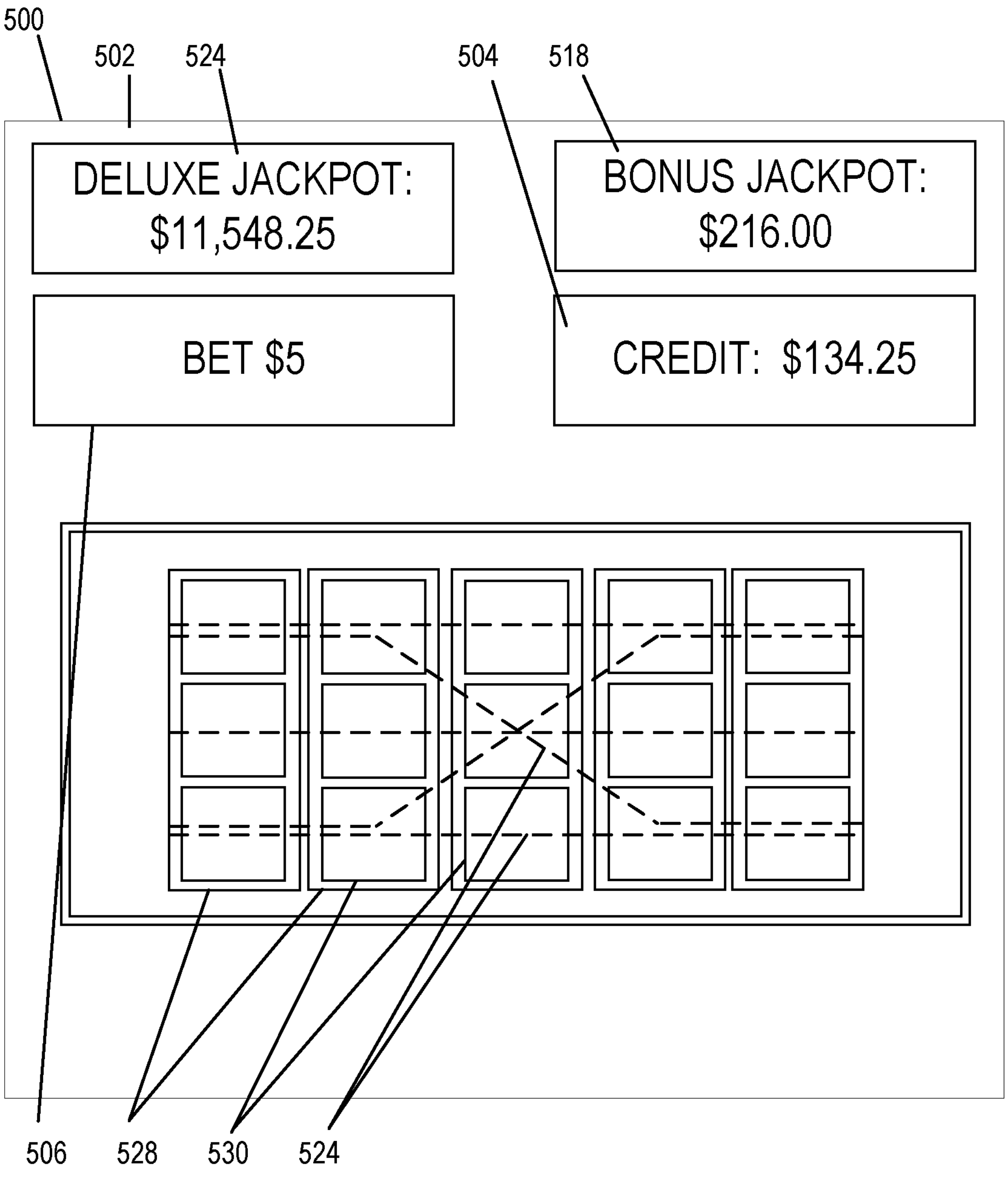
FIGS. 5A-5C are diagrams of a GUI for a slot-style wagering game including a standard progressive feature and an event-based progressive feature, according to some embodiments.
Figure 5B:
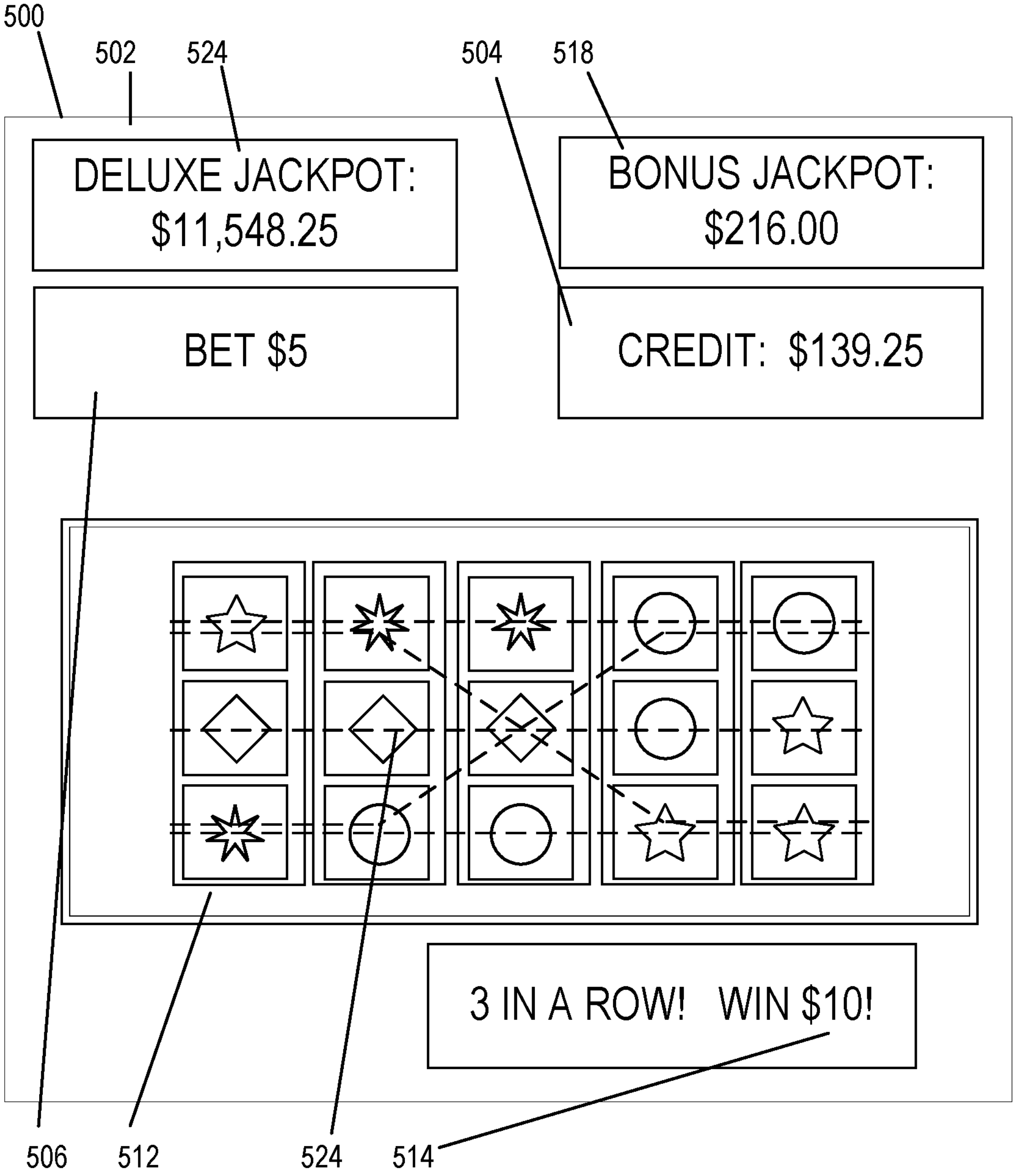
Figure 5C:
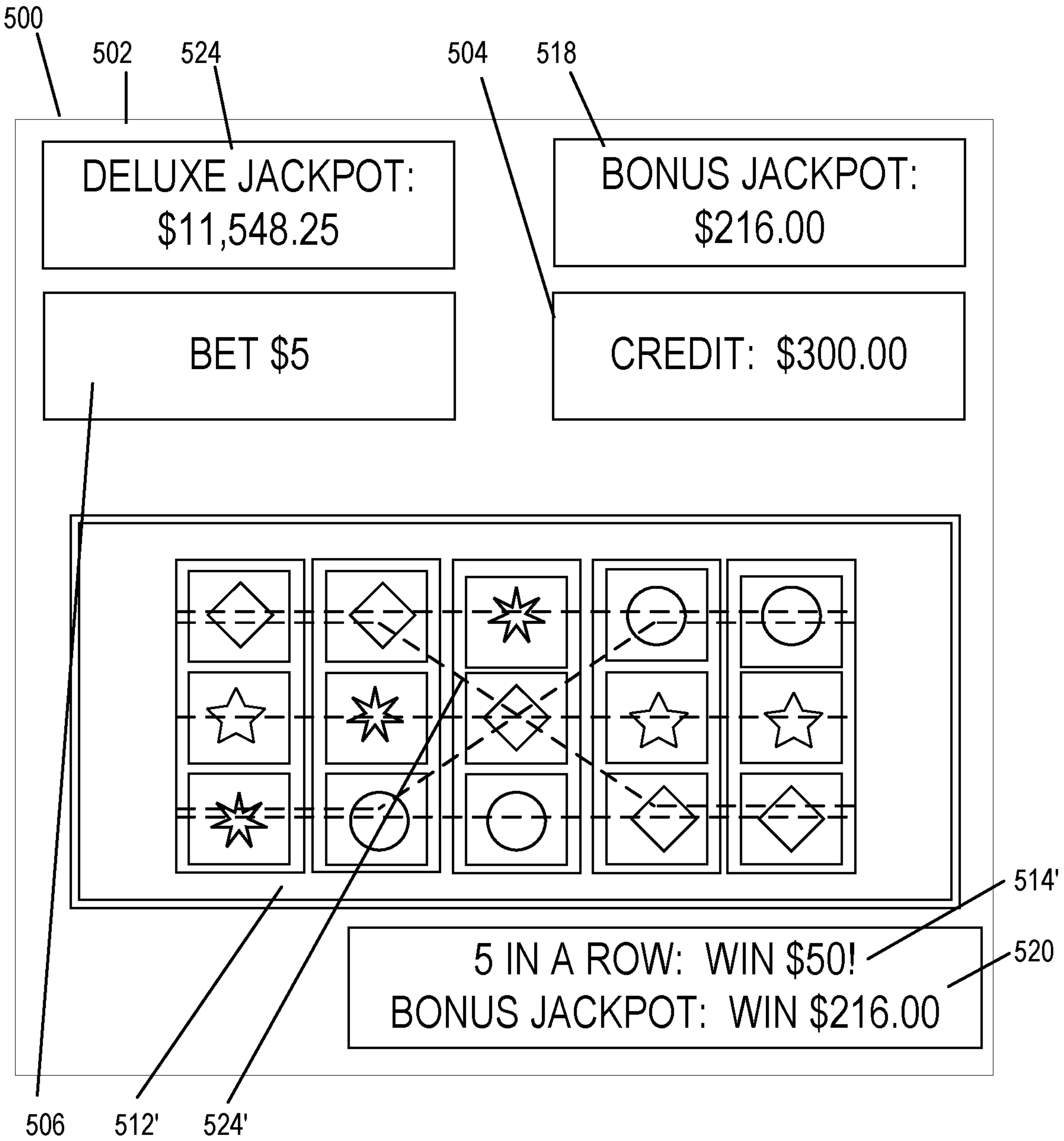

The GUI 502 of FIGS. 5A-5C may include a credit meter 504, a bet button 506, a game board 508, which includes a plurality of reels 528 each having a plurality of slot symbol positions 530 to arrange a plurality of slot symbols 532 along a plurality of paylines 524. The GUI 502 also includes an event-based progressive meter 516 including an event-based progressive pot 518 (i.e., called a "bonus jackpot" in this example) and a separate standard progressive meter 522 including a standard progressive pot 522, and may include additional or different graphical elements, as desired.

As shown in FIG. 5A, the bet button 504 is configured to place a wager, a portion of which funds the standard progressive pot 522 in response to the wager meeting certain criteria, such as meeting a minimum wager threshold. As shown by FIG. 5B, in response to a winning game result 512 (e.g., a matching sequence of three game symbols 510 along a particular payline), a primary game award 514 is awarded based on a predetermined paytable, and it is also determined whether the game result 512 meets the criteria for awarding the standard progressive pot 522 and/or the event-based progressive pot 518. In this example, the winning game result 512 is not sufficient to awarding the standard progressive pot 522 and/or the event-based progressive pot 518, but the winning game results 512 is sufficient to cause the event-based progressive pot 518 to be funded using a portion of the wager.

A shown by FIG. 5C, another winning game results 512' (a sequence of five matching game symbols 510 along payline 524') results in a primary game award 514' being paid and is sufficient to trigger an event-based progressive win as well, which causes the standard progressive pot the event-based progressive pot 518 to be awarded as an event-based progressive award 520.

a subsequent game result 412" (a straight flush) causes a primary game award 414" to be paid according to the predetermined paytable, and the event-based progressive pot to be paid out as an event-based progressive award 420". FIG. 4E illustrates another game result 412'" (a royal flush), which causes a primary game award 414'" to be paid according to the predetermined paytable, and both the event-based progressive pot 418 to be paid out as an event-based progressive award 420'" and the standard progressive pot 424 to be paid out as a standard progressive award 426".

Figure 6:
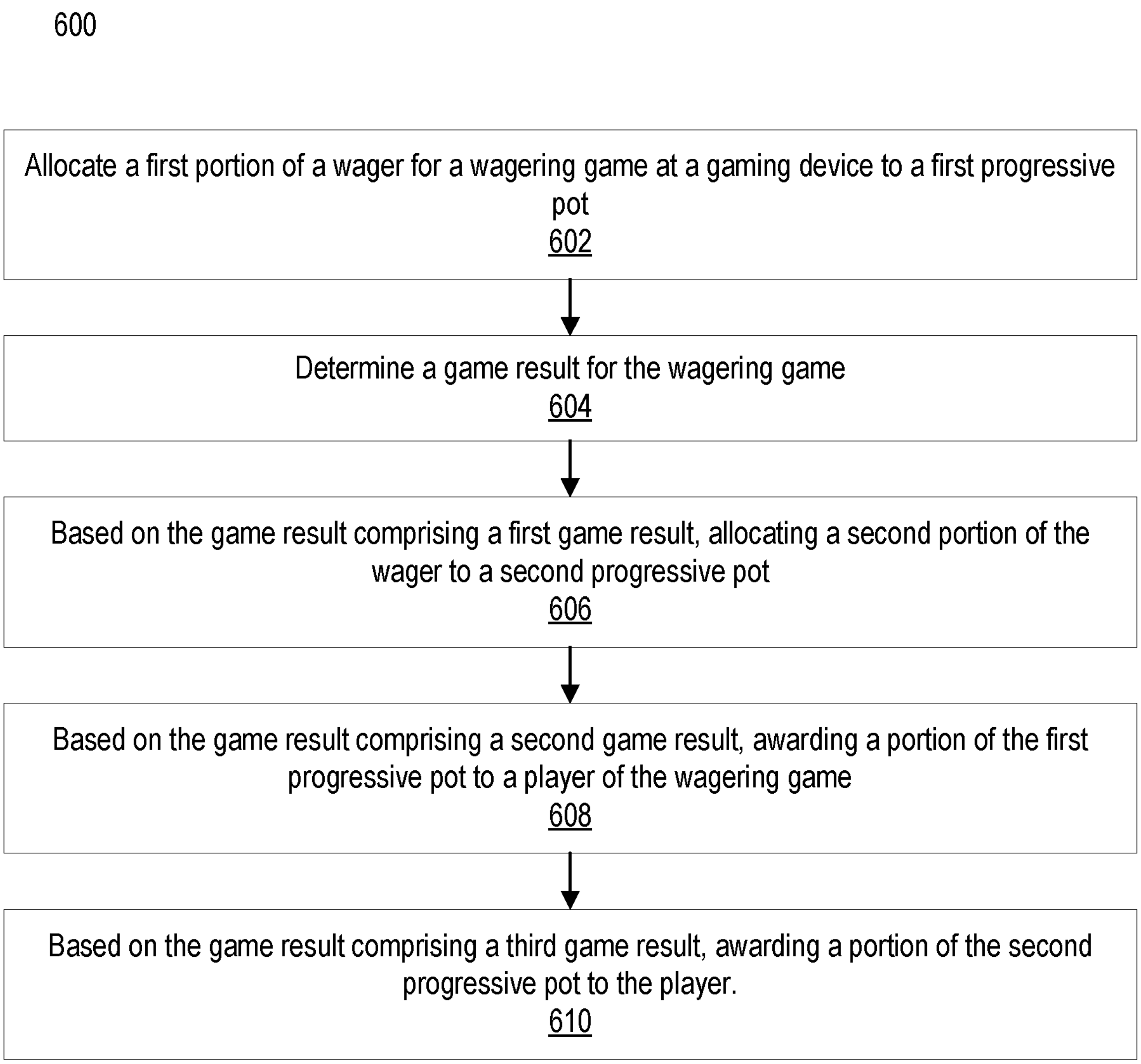
FIG. 6 is a flowchart illustrating operations of systems/methods of facilitating participation in a wagering game between multiple devices, according to some embodiments.

FIG. 6 is a flowchart illustrating operations 600 of systems/methods for facilitating embodiments described herein. The operations 600 may be performed by one or more processor circuits of one or more computing devices, such as any of the computing devices described herein, for example. The operations 600 may include allocating a first portion of a wager for a wagering game at a gaming device to a first progressive pot (Block 602). For example, as discussed above with respect to the wagering game of FIGS. 4A-4E, a portion of the primary wager for a video poker-style wagering game is allocated to a standard progressive pot 422.

The operations 600 may further include determining a game result for the wagering game (Block 604), and, based on the game result comprising a first game result, allocating a second portion of the wager to a second progressive pot (Block 606). For example, in the embodiment of FIG. 4B, the game result 412 qualifies to fund a separate event-based progressive pot 418.

The operations 600 may further include, based on the game result comprising a second game result, awarding a portion of the first progressive pot to a player of the wagering game (Block 608). Referring again to the embodiment of FIGS. 4A-4E, a winning game result 412" of FIG. 4D is sufficient to trigger an award of the standard progressive pot 422 as a standard progressive award 426.

The operations 600 may further include, based on the game result comprising a third game result, awarding a portion of the second progressive pot to the player (Block 610). As shown in FIGS. 4D and 4E, the game results 412", 412''' are both sufficient to trigger an award of the event-based progressive pot 418 as an event-based progressive award 420.

Embodiments described herein may be implemented in various configurations for gaming devices 100, including but not limited to: (1) a dedicated gaming device, wherein the computerized instructions for controlling any games (which are provided by the gaming device) are provided with the gaming device prior to delivery to a gaming establishment; and (2) a changeable gaming device, where the computerized instructions for controlling any games (which are provided by the gaming device) are downloadable to the gaming device through a data network when the gaming device is in a gaming establishment. In some embodiments, the computerized instructions for controlling any games are executed by at least one central server, central controller or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller or remote host to a gaming device local processor and memory devices. In such a "thick client" embodiment, the gaming device local processor executes the communicated computerized instructions to control any games (or other suitable interfaces) provided to a player.

In some embodiments, a gaming device may be operated by a mobile device, such as a mobile telephone, tablet other mobile computing device. For example, a mobile device may be communicatively coupled to a gaming device and may include a user interface that receives user inputs that are received to control the gaming device. The user inputs may be received by the gaming device via the mobile device.

In some embodiments, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

The present disclosure contemplates a variety of different gaming systems each having one or more of a plurality of different features, attributes, or characteristics. It should be appreciated that a "gaming system" as used herein refers to various configurations of: (a) one or more central servers, central controllers, or remote hosts; (b) one or more gaming devices; and/or (c) one or more personal gaming devices, such as desktop computers, laptop computers, tablet computers or computing devices, PDAs, mobile telephones such as smart phones, and other mobile computing devices.

In certain such embodiments, computerized instructions for controlling any games (such as any primary or base games and/or any secondary or bonus games) displayed by the gaming device are executed by the central server, central controller, or remote host. In such "thin client" embodiments, the central server, central controller, or remote host remotely controls any games (or other suitable interfaces) displayed by the gaming device, and the gaming device is utilized to display such games (or suitable interfaces) and to receive one or more inputs or commands. In other such embodiments, computerized instructions for controlling any games displayed by the gaming device are communicated from the central server, central controller, or remote host to the gaming device and are stored in at least one memory device of the gaming device. In such "thick client" embodiments, the at least one processor of the gaming device executes the computerized instructions to control any games (or other suitable interfaces) displayed by the gaming device.

In some embodiments in which the gaming system includes: (a) a gaming device configured to communicate with a central server, central controller, or remote host through a data network; and/or (b) a plurality of gaming devices configured to communicate with one another through a data network, the data network is an internet or an intranet. In certain such embodiments, an internet browser of the gaming device is usable to access an internet game page from any location where an internet connection is available. In one such embodiment, after the internet game page is accessed, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. It should be appreciated, however, that the central server, central controller, or remote host may identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the gaming device, such as by identifying the MAC address or the IP address of the internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the internet browser of the gaming device.

It should be appreciated that the central server, central controller, or remote host and the gaming device are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile internet network), or any other suitable medium. It should be appreciated that the expansion in the quantity of computing devices and the quantity and speed of internet connections in recent years increases opportunities for players to use a variety of gaming devices to play games from an ever-increasing quantity of remote sites. It should also be appreciated that the enhanced bandwidth of digital wireless communications may render such technology suitable for some or all communications, particularly if such communications are encrypted. Higher data transmission speeds may be useful for enhancing the sophistication and response of the display and interaction with players.

In the above-description of various embodiments, various aspects may be illustrated and described herein in any of a number of patentable classes or contexts including any new and useful process, machine, manufacture, or composition of matter, or any new and useful improvement thereof. Accordingly, various embodiments described herein may be implemented entirely by hardware, entirely by software (including firmware, resident software, micro-code, etc.) or by combining software and hardware implementation that may all generally be referred to herein as a "circuit," "module," "component," or "system." Furthermore, various embodiments described herein may take the form of a computer program product including one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, radio frequency ("RF"), etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, Common Business Oriented Language ("COBOL") 2002, PHP: Hypertext Processor ("PHP"), Advanced Business Application Programming ("ABAP"), dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Various embodiments were described herein with reference to flowchart illustrations and/or block diagrams of methods, apparatus (systems), devices and computer program products according to various embodiments described herein. It will be understood that each block of the flowchart illustrations and/or block diagrams, and combinations of blocks in the flowchart illustrations and/or block diagrams, can be implemented by computer program instructions. These computer program instructions may be provided to a processing circuit of a general purpose computer, special purpose computer, or other programmable data processing apparatus to produce a machine, such that the instructions, which execute via the processing circuit of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operations to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms “a”, “an” and “the” are intended to include the plural forms as well, unless the context clearly indicates otherwise. It will be further understood that the terms “comprises” and/or “comprising,” when used in this specification, specify the presence of stated features, steps, operations, elements, and/or components, but do not preclude the presence or addition of one or more other features, steps, operations, elements, components, and/or groups thereof. As used herein, the term “and/or” includes any and all combinations of one or more of the associated listed items and may be designated as “/”. Like reference numbers signify like elements throughout the description of the figures.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

What is claimed is:

1. A gaming device comprising:
- an input device;
- a communication interface in communication with a progressive server;
- a processor circuit; and
- a memory comprising machine-readable instructions that, when executed by the processor circuit, cause the processor circuit to:
  - receive an input at the input device indicative of a wager for a wagering game at a gaming device;
  - instruct, via the communication interface, the progressive server to allocate a first portion of the wager to a first progressive pot;
  - determine a game result for the wagering game;
  - based on the game result comprising a first game result, instruct, via the communication interface, the progressive server to allocate a second portion of the wager to a second progressive pot;
  - based on the game result comprising a second game result, instruct, via the communication interface, the progressive server to award a portion of the first progressive pot to a player of the wagering game; and
  - based on the game result comprising a third game result, instruct, via the communication interface, the progressive server to award a portion of the second progressive pot to the player.

2. The gaming device of claim 1, wherein the first game result is a winning game result, and
- wherein the instructions further cause the processor circuit to award, by the gaming device, a first base game award to the player based on the first game result.

3. The gaming device of claim 2, wherein the third game result is a winning game result,
- wherein the instructions further cause the processor circuit to award, by the gaming device, a second base game award separate from the portion of the second progressive pot to the player based on the third game result, wherein the second base game award comprises a higher value than the first base game award.

4. The gaming device of claim 2, wherein the wager comprises a primary wager amount, and
- wherein the first base game award is further based on the primary wager amount, and
- wherein the second portion of the wager allocated to the second progressive pot comprises a portion of the primary wager amount.

5. The gaming device of claim 2, wherein the wager comprises a primary wager amount and a secondary wager amount, and
- wherein the first base game award is further based on the primary wager amount, and
- wherein the second portion of the wager allocated to the second progressive pot comprises a portion of the secondary wager amount.

6. The gaming device of claim 5, wherein the first base game award is determined independently of the secondary wager amount.

7. The gaming device of claim 5, wherein the second portion of the wager allocated to the second progressive pot does not comprise a portion of the primary wager amount.

8. The gaming device of claim 1, wherein the allocation of the second portion of the wager to the second progressive pot is further based on the wager meeting a minimum wager threshold.

9. The gaming device of claim 1, wherein the award of the portion of the second progressive pot is further based on the wager meeting a minimum wager threshold.

10. The gaming device of claim 1, wherein the wagering game is a video poker game,
- wherein the first game result comprises a first winning poker hand, and
- wherein the second game result comprises a second winning poker hand better than the first winning poker hand.

11. A video poker gaming device comprising:
- an input device;
- a communication interface in communication with a progressive server;
- a dispenser device;
- a processor circuit; and a memory comprising machine-readable instructions that, when executed by the processor circuit, cause the processor circuit to:

receive an input at the input device indicative of a wager for a video poker wagering game at a gaming device;

determine a game result for the wagering game, the game result comprising a poker hand;

based on the poker hand comprising a first winning poker hand, instruct, via the communication interface, the progressive server to allocate a first portion of the wager to a progressive pot and instruct the dispenser device to award a first base game award to a player of the wagering game; and based on the poker hand comprising a second winning poker hand better than the first winning poker hand, instruct the dispenser device to award a second base game award and instruct, via the communication interface, the progressive server to award a portion of the progressive pot to the player.

12. The video poker gaming device of claim 11, wherein the second base game award comprises a higher value than the first base game award.

13. The video poker gaming device of claim 11, wherein the wager comprises a primary wager amount, and wherein the first base game award is further based on the primary wager amount, and wherein the first portion of the wager allocated to the progressive pot comprises a portion of the primary wager amount.

14. The video poker gaming device of claim 11, wherein the wager comprises a primary wager amount and a secondary wager amount, and wherein the first base game award is further based on the primary wager amount, and wherein the first portion of the wager allocated to the progressive pot comprises a portion of the secondary wager amount.

15. The video poker gaming device of claim 14, wherein the first base game award is determined independently of the secondary wager amount.

16. The video poker gaming device of claim 14, wherein the first portion of the wager allocated to the progressive pot does not comprise a portion of the primary wager amount.

17. The video poker gaming device of claim 11, wherein the allocation of the first portion of the wager to the progressive pot is further based on the wager meeting a minimum wager threshold.

18. The video poker gaming device of claim 11, wherein the award of the portion of the progressive pot is further based on the wager meeting a minimum wager threshold.

19. The video poker gaming device of claim 11, wherein the instructions further cause the processor circuit to:

based on receipt of the wager, instruct, via the communication interface, the progressive server to allocate a second portion of the wager to a standard progressive pot separate from the progressive pot; and based on the poker hand comprising a third winning poker hand, instruct, via the communication interface, the progressive server to award a portion of the standard progressive pot to the player.

* * * * *